(12) United States Patent
Jiang et al.

(10) Patent No.: US 7,625,965 B2
(45) Date of Patent: Dec. 1, 2009

(54) RUBBER COMPOSITION, PROCESS OF PREPARING SAME AND ARTICLES MADE THEREFROM

(75) Inventors: Ping Jiang, New City, NY (US); Chris Hartshorn, Ossining, NY (US); Eric R. Pohl, Mt. Kisco, NY (US)

(73) Assignee: Momentive Performance Materials Inc., Albany, NY (US)

( * ) Notice: Subject to any disclaimer, the term of this patent is extended or adjusted under 35 U.S.C. 154(b) by 0 days.

(21) Appl. No.: 11/703,969

(22) Filed: Feb. 8, 2007

(65) Prior Publication Data

US 2008/0194746 A1 Aug. 14, 2008

(51) Int. Cl.
C08K 5/24 (2006.01)

(52) U.S. Cl. ............... 524/263; 524/430; 524/431; 524/432; 524/433; 524/437

(58) Field of Classification Search ............... 524/263, 524/430, 431, 432, 433, 437
See application file for complete search history.

(56) References Cited

U.S. PATENT DOCUMENTS

| | | | |
|---|---|---|---|
| 3,692,812 A | 9/1972 | Berger | |
| 3,925,435 A | 12/1975 | Crosby et al. | |
| 4,222,915 A | 9/1980 | Wolff et al. | |
| 4,297,145 A | 10/1981 | Wolff et al. | |
| 5,116,886 A | 5/1992 | Wolff et al. | |
| 5,268,439 A | 12/1993 | Hergenrother et al. | |
| 5,821,290 A | 10/1998 | Labauze | |
| 6,005,027 A | 12/1999 | Guillet et al. | |
| 6,136,913 A | 10/2000 | Nahmias et al. | |
| 6,706,398 B1 * | 3/2004 | Revis | 428/405 |
| 2004/0014869 A1 | 1/2004 | Wong et al. | |
| 2006/0025506 A1 * | 2/2006 | Weller et al. | 524/263 |

FOREIGN PATENT DOCUMENTS

| | | |
|---|---|---|
| EP | 0631982 | 1/1995 |
| JP | 1029385 | 1/1989 |
| JP | 2005-232445 | 2/2005 |
| WO | WO 01 49781 | 7/2001 |
| WO | WO 02 22728 | 3/2002 |
| WO | WO2004/024812 A2 | 3/2004 |
| WO | WO2004/024813 A2 | 3/2004 |
| WO | WO 2004024831 A2 * | 3/2004 |
| WO | WO2004/078835 A1 | 9/2004 |

* cited by examiner

*Primary Examiner*—Peter D Mulcahy
(74) *Attorney, Agent, or Firm*—Dominick G. Vicari; Joseph S. Ostroff

(57) ABSTRACT

There is provided herein a rubber composition comprising (a) at least one rubber component; (b) at least one silane-reactive filler; (c) optionally, at least one activating agent and, (d) at least one silane of the general Formula (1):

$$[X^1X^2X^3Si{-}]_d(G)_a[{-}Y{-}(CR_{3-e}{-}Z_e)_b]_c \quad (1)$$

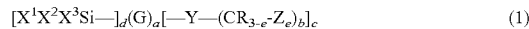

wherein $X^1$ is selected hydrolyzable groups; $X^2$ and $X^3$ are independently hydrocarbons or selected hydrolyzable groups;

G is a hydrocarbon group of from 1 to 18 carbon atoms that can optionally contain at least one heteroatom selected from the group consisting of oxygen, sulfur, phosphous and silicon; each Y can independently be an unsaturated group; each Z can independently be a halogen atom; and, each R can independently be hydrogen, alkyl, alkenyl, aryl or aralkyl. There is also provided a process of preparing a rubber composition comprising mixing (a), (b), optionally (c), and (d). There are also provided articles (e.g., tires) made from the rubber composition.

35 Claims, No Drawings

RUBBER COMPOSITION, PROCESS OF PREPARING SAME AND ARTICLES MADE THEREFROM

BACKGROUND OF THE INVENTION

1) Field of the Invention

The present disclosure relates to rubber compositions comprising unsaturated organic polymers, fillers and silane. The present disclosure also provides for a process of making said rubber composition as well as articles made therefrom.

2) Description of Related Art

The use of the silica/silane-filler system to reduce the rolling resistance and improve the wet traction of passenger car tires is well known in the art. A reduction of rolling resistance and therefore less fuel consumption are also of strong interest for truck tires. However, the use of silica to replace carbon black filler in natural rubber (NR) containing formulations, such as truck tread compounds, is limited, due to the poor abrasion resistance. At the present time, truck tire treads use highly reinforcing carbon black for maximum reinforcement and excellent resistance to abrasion. The replacement of carbon black by silica in truck applications has been hampered by ineffective coupling of the silica to the polymer chains of natural rubber.

The polysulfurized alkoxysilanes, such as bis(triethoxysilylpropyl)tetrasulfite (TESPT), and blocked mercapto-functional silanes such as 3-octanoylthio-1-propyltriethoxysilane, are currently regarded as the most effective and the most widely used coupling agents in rubber compositions for tires, especially those compositions containing styrene-butadiene rubber or butadiene rubber. The reinforcing efficiency and abrasion resistance of vulcanizates filled with silica are not good enough to justify the replacement of carbon black in formulations containing high levels of natural rubber.

The use of non-sulfur silanes is focused on the use of activated double bonds to improve the coupling between fillers and polymer, notably natural rubber. But these non-sulfur coupling agents have shown inadequate coupling performances or performances inferior to those offered by polysulfurized silanes such as bis(triethoxysilylpropyl)tetrasulfide. In addition, the known non-sulfur silanes are very reactive with conventional fillers and elastomers and are therefore difficult to use. When known non-sulfur silanes are used at levels necessary to achieve optimum coupling of filler to the host elastomer, the uncured filled elastomer typically exhibits poorly dispersed filler and short scorch times during curing. Both good filler dispersion and good filler reinforcing efficiency are required to achieve satisfactory end-use properties.

It would be desirable for various rubber applications to have a rubber composition that utilizes increased levels of silica and lower levels of carbon black while still exhibiting the properties of low scorch, good filler dispersion and improved abrasion resistance.

BRIEF DESCRIPTION OF THE INVENTION

In one embodiment herein, there is provided a rubber composition comprising:

(a) at least one rubber component;
(b) at least one silane-reactive filler;
(c) optionally, at least one activating agent; and,
(d) at least one hydrolyzable silane of general Formula (1):

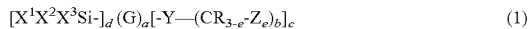

$$[X^1X^2X^3Si\text{-}]_d(G)_a[\text{-}Y\text{---}(CR_{3-e}\text{-}Z_e)_b]_c \quad (1)$$

wherein each occurrence of $X^1$ is independently selected from a hydrolyzable group consisting of Cl—, Br—, I—, $R^1O$—, $R^1(\text{=}O)O$—, $R^1{}_2C\text{=}NO$—, and $R^1{}_2NO$—, wherein each $R^1$ is independently selected from the group consisting of hydrogen, straight, cyclic or branched alkyl, alkenyl, aryl and aralkyl groups wherein each $R^1$, other than hydrogen, contains from 1 to 18 carbon atoms and optionally at least one heteroatom selected from the group consisting of oxygen and sulfur;

each occurrence of $X^2$ and $X^3$ is independently selected from $X^1$ and $R^2$ groups wherein each $R^2$ is independently selected from the group consisting of hydrogen, alkyl, alkenyl, aryl and aralkyl groups wherein each $R^2$, other than hydrogen, contains from 1 to 18 carbon atoms and optionally at least one heteroatom selected from the group consisting of oxygen and sulfur;

each occurrence of G is independently a divalent or polyvalent hydrocarbon group of from 1 to about 18 carbon atoms that can optionally contain at least one heteroatom selected from the group consisting of oxygen, sulfur, phosphorous and silicon;

each occurrence of Y is independently an unsaturated group;

each occurrence of Z is independently a halogen atom selected from the groups consisting of F—, Cl—, Br— and I—;

each occurrence of R is independently selected from the group consisting of hydrogen, alkyl, alkenyl, aryl or aralkyl wherein each R, other than hydrogen, contains from 1 to 30 carbon atoms; and, each occurrence of subscripts a, b, c and d are integers independently given by a is 0 or 1; b is an integer of from 1 to about 5; c is an integer of from 1 to 3, with the provisos that when a is zero, c is 1, and when a is 1, c is an integer of from 1 to 3, d is an integer of from 1 to about 5; and, e is an integer from 1 to 3.

There is also provided herein a process of preparing the above-described rubber composition comprising mixing components (a), (b), optionally (c), and (d).

DETAILED DESCRIPTION OF THE INVENTION

It has been unexpectedly discovered that certain silane coupling agents provide improved properties to rubber compositions used in cured articles such as the non-limiting example of tires.

It will be understood herein that all weight percents are based upon total weight percent of the rubber composition herein, unless stated otherwise.

It will also be understood herein that all ranges stated herein comprise all subranges there between and can further comprise any combination of ranges and/or subranges.

In one embodiment herein, there is provided a rubber composition comprising:

(a) at least one rubber component;
(b) at least one silane-reactive filler;
(c) optionally, at least one activating agent; and,
(d) at least one hydrolyzable silane of general Formula (1):

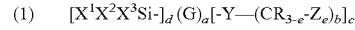

$$(1) \quad [X^1X^2X^3Si\text{-}]_d(G)_a[\text{-}Y\text{---}(CR_{3-e}\text{-}Z_e)_b]_c$$

wherein each occurrence of $X^1$ is independently selected from a hydrolyzable group consisting of Cl—, Br—, I—, $R^1O$—, $R^1(=O)O$—, $R^1{}_2C=NO$—, and $R^1{}_2NO$—, wherein each $R^1$ is independently selected from the group consisting of hydrogen, alkyl, alkenyl, aryl and aralkyl groups wherein each $R^1$, other than hydrogen, contains from 1 to 18 carbon atoms and optionally at least one heteroatom selected from the group consisting of oxygen and sulfur;

each occurrence of $X^2$ and $X^3$ is independently selected from $X^1$ and $R^2$-groups wherein each $R^2$ is independently selected from the group consisting of hydrogen, straight, cyclic or branched alkyl, alkenyl, aryl and aralkyl groups wherein each $R^2$, other than hydrogen, contains from 1 to 18 carbon atoms and optionally at least one heteroatom selected from the group consisting of oxygen and sulfur;

each occurrence of G is independently a divalent or polyvalent hydrocarbon group of from 1 to about 18 carbon atoms that can optionally contain at least one heteroatom selected from the group consisting of oxygen, sulfur, phosphorous and silicon;

each occurrence of Y is independently an unsaturated group;

each occurrence of Z is independently a halogen atom selected from the groups consisting of F—, Cl—, Br— and I—;

each occurrence of R is independently selected from the group consisting of hydrogen, alkyl, alkenyl, aryl or aralkyl wherein each R, other than hydrogen, contains from 1 to 30 carbon atoms; and, each occurrence of subscripts a, b and c are integers independently given by a is 0 or 1; b is an integer of from 1 to about 5; c is an integer of from 1 to 3, with the provisos that when a is zero, c is 1, and when a is 1, c is an integer of from 1 to 3; d is an integer of from 1 to 5; and, e is an integer of from 1 to 3.

In one embodiment herein in connection with the silane of Formula (1), "alkyl" includes straight, branched and cyclic alkyl groups; "alkenyl" includes any straight, branched, or cyclic alkenyl group containing one or more carbon-carbon double bonds, where the point of substitution can be either at a carbon-carbon double bond or elsewhere in the group; "alkynyl" includes any straight, branched or cyclic alkynyl group containing one or more carbon-carbon triple bonds, where the point of substitution can be either at a carbon-carbon triple bond or elsewhere in the group; "aryl" includes the non-limiting group of any aromatic hydrocarbon from which one hydrogen atom has been removed; "aralkyl" includes, but is not limited to, any of the aforementioned alkyl groups in which one or more hydrogen atoms have been substituted by the same number of like and/or different aryl (as defined herein) substituents. Specific examples of alkyls include, but are not limited to, methyl, ethyl, propyl and isobutyl. Specific examples of alkenyls include, but are not limited to, vinyl, propenyl, allyl, methallyl, ethylidenyl norbornane, ethylidene norbornyl and ethylidene norornenyl. Specific examples of aryls include, but are not limited to, tolyl, xylyl, phenyl and naphthalenyl. Specific examples of aralkyls include, but are not limited to, benzyl and phenethyl.

In one embodiment herein, $X^1$ of the general Formula (1) is a hydrolyzable group. Some non-limiting representative examples of $X^1$ include alkoxy groups such as the non-limited examples methoxy, ethoxy, propoxy, isopropoxy, butoxy, phenoxy and benzyloxy; hydroxyl group; halo groups such as the non-limiting examples chloro, bromo and iodo; oximato groups such as the non-limiting examples methylethyloximato, phenylmethyloximato and dimethyloximato; aminoeoxy groups such as the non-limiting examples dimethylamineoxy, diethylamineoxy and methylphenyamineoxy; and, acyloxy groups such as the non-limiting examples formyloxy, acetoxy and propanoyloxy.

Some representative non-limiting examples of $X^2$ and $X^3$ in Formula (1) include the representative examples listed above for $X^1$ as well as hydrogen, alkyl groups such as the non-limiting examples methyl, ethyl, propyl, isopropyl, sec-butyl and cyclohexyl; higher straight-chain alkyl such as butyl, hexyl, octyl, lauryl and octadecyl; alkenyl groups such as the non-limiting examples vinyl, allyl, methallyl and 3-butenyl; aryl groups such as the non-limiting examples phenyl and tolyl; and, aralkyl groups such as the non-limiting examples benzyl and phenethyl.

In another embodiment, G of Formula (1) can be any divalent or polyvalent hydrocarbon and can optionally contain at least one heteroatom selected from the group consisting of oxygen, sulfur, phosphorus and silicon atoms. The numbers of carbon atoms in group G is specifically from 1 to 18, more specifically from 1 to 12, even more specifically from 1 to 8 and most specifically from 1 to 4. In one specific embodiment, some representative examples of G include, but are not limited to, those selected from the group consisting of diethylene cyclohexane; 1,2,4-triethylene cyclohexane; diethylene benzene; phenylene; —$(CH_2)_g$— wherein g is preferably 1 to 18, which represent terminal straight-chain alkyls further substituted terminally at the other end such as —$CH_2$—, —$CH_2CH_2$—, —$CH_2CH_2CH_2$— and —$CH_2CH_2CH_2CH_2CH_2CH_2CH_2CH_2$—, and their beta-substituted analogs such as —$CH_2(CH_2)_iCH(CH_3)$— where i is preferably 0 to 15; —$CH_2CH_2C(CH_3)_2CH_2$—; the structure derivable from methallyl chloride, —$CH_2CH(CH_3)CH_2$—; any of the structures derivable from divinylbenzene such as —$CH_2CH_2(C_6H_4)CH_2CH_2$— and —$CH_2CH_2(C_6H_4)CH(CH_3)$— where the notation $C_6H_4$ denotes a disubstituted benzene ring; any of the structures derivable from dipropenylbenzene such as —$CH_2CH(CH_3)(C_6H_4)CH(CH_3)CH_2$— where the notation $C_6H_4$ denotes a disubstituted benzene ring; any of the structures derivable from butadiene such as —$CH_2CH_2CH_2CH_2$—, —$CH_2CH_2CH(CH_3)$— and —$CH_2CH(CH_2CH_3)$—; any of the structures derivable from piperylene such as —$CH_2CH_2CH_2CH(CH_3)$—, —$CH_2CH_2CH(CH_2CH_3)$— and —$CH_2CH(CH_2CH_2CH_3)$—; any of the structures derivable from isoprene, such as —$CH_2CH(CH_3)CH_2CH_2$—, —$CH_2CH(CH_3)CH(CH_3)$—, —$CH_2C(CH_3)(CH_2CH_3)$—, —$CH_2CH_2CH(CH_3)CH_2$—, —$CH_2CH_2C(CH_3)_2$— and —$CH_2CH[CH(CH_3)_2]$—; any of the isomers of —$CH_2CH_2$-norbornyl-, —$CH_2CH_2$-cyclohexyl-; any of the diradicals obtainable from norbornane, cyclohexane, cyclopentane, tetrahydrodicyclopentadiene or cyclododecene by loss of two hydrogen atoms; the structures derivable from limonene, —$CH_2CH(4$-$CH_3$-1-$C_6H_9$—)$CH_3$, where the notation $C_6H_9$ denotes isomers of the trisubstituted cyclohexane ring lacking substitution in the 2 position; any of the monovinyl-containing structures derivable from trivinylcyclohexane such as —$CH_2CH_2(vinylC_6H_9)CH_2CH_2$— and —$CH_2CH_2(vinylC_6H_9)CH(CH_3)$— where the notation $C_6H_9$ denotes any isomer of the trisubstituted cyclohexane ring; any of the monounsaturated structures derivable from myrcene containing a trisubstituted C=C such as —$CH_2CH[CH_2CH_2CH=C(CH_3)_2]CH_2CH_2$—, —$CH_2CH[CH_2CH_2CH=C(CH_3)_2]CH(CH_3)$—, —$CH_2C[CH_2CH_2CH=C(CH_3)_2](CH_2CH_3)$—, —$CH_2CH_2CH[CH_2CH_2CH=C(CH_3)_2]CH_2$—, —$CH_2CH_2(C$—$)(CH_3)[CH_2CH_2CH=C(CH_3)_2]$ and —$CH_2CH[CH(CH_3)[CH_2CH_2CH=C(CH_3)_2]]$—; any of the monounsaturated structures derivable from myrcene lacking a trisubstituted C=C such as —CH$_2$CH(CH=CH$_2$)CH$_2$CH$_2$CH$_2$C(CH$_3$)$_2$—, —CH$_2$CH(CH=CH$_2$)CH$_2$CH$_2$CH[CH(CH$_3$)$_2$]—, —CH$_2$C(=CH—CH$_3$)CH$_2$CH$_2$CH$_2$C(CH$_3$)$_2$—, —CH$_2$C(=CH—CH$_3$)CH$_2$CH$_2$CH[CH(CH$_3$)$_2$]—, —CH$_2$CH$_2$C(=CH$_2$)CH$_2$CH$_2$CH$_2$C(CH$_3$)$_2$—, —CH$_2$CH$_2$C(=CH$_2$)CH$_2$CH$_2$CH[CH(CH$_3$)$_2$]—, —CH$_2$CH=C(CH$_3$)$_2$CH$_2$CH$_2$CH$_2$C(CH$_3$)$_2$— and —CH$_2$CH=C(CH$_3$)$_2$CH$_2$CH$_2$CH[CH(CH$_3$)$_2$]—; and, any of the straight chain or branched alkylenes substituted with at least one heteroatom such as —CH$_2$CH$_2$OCH$_2$—, —CH$_2$CH$_2$OCH$_2$CH$_2$OCH$_2$CH$_2$—, —CH$_2$CH$_2$SCH$_2$CH$_2$SCH$_2$CH$_2$—, —CH$_2$CH$_2$Si(CH$_3$)$_2$CH$_2$CH$_2$— and —CH$_2$CH$_2$Si(OCH$_3$)$_2$CH$_2$CH$_2$—.

In yet another embodiment, Y of Formula (1) is a divalent or polyvalent unsaturated hydrocarbon group of from 2 to 12 carbon atoms containing at least one carbon-carbon double bond that is bonded to the —CR$_{3-e}$Z$_e$ fragment or at least one carbon-carbon triple bond that is bonded to the —CR$_{3-e}$Z$_e$ fragment of Formula (1). The carbon-carbon double bond or carbon-carbon triple bond can be conjugated or non-conjugated with other carbon-carbon double and/or triple bonds and can include aromatic ring structures. When b in Formula (1) is at least two, then the —CR$_{3-e}$Z$_e$ fragments can be bonded to the same carbon atom on the carbon-carbon double bond, on adjacent carbon atoms of the carbon-carbon double bond or on the carbon atoms of different carbon-carbon bonds. Some non-limiting representative examples of Y are alkenylene groups such as —CH=CH—, —CH$_2$CH=CH—, —CH$_2$CH$_2$CH=CH— and —CH$_2$CH=CH—CH=CH— and —CH=C(—)$_2$; alkynylene groups such as —C≡C—, —CH$_2$C≡C— and —CH$_2$CH$_2$C≡C—; and, aromatic groups such as phenylene and 2-methylphenylene.

In yet even another embodiment, Z of Formula (1) is the halogen atom Cl—.

In an even further embodiment herein, R of Formula (1) is hydrogen; a straight, branched or cyclic alkyl group of specifically up to 30 carbon atoms, more specifically up to 10 carbon atoms, even more specifically up to 6 carbon atoms and most specifically 3 carbon atoms; (a straight, branched or cyclic alkenyl group containing one or more carbon-carbon double bond where the point of substitution can be either at a carbon-carbon double bond or elsewhere in the group and where the alkenyl group contains specifically up to 30 carbon atoms, more specifically up to 10 carbon atoms, even more specifically up to 6 carbon atoms and most specifically up to 3 carbon atoms; an aryl group containing specifically up to 30 carbon atoms, more specifically up to 20 carbon atoms, even more specifically up to 12 carbon atoms and most specifically up to 8 carbon atoms.

In one embodiment herein, representative examples of R include alkyl groups such as the non-limiting examples methyl, ethyl, propyl and isobutyl; alkenyl groups such as the non-limiting examples vinyl, propenyl, allyl, methallyl, ethylidenyl norbornane, ethylidene norbornyl, ethylidenyl norbornene and ethylidene norbornenyl; aryl groups such as the non-limiting examples phenyl and naphthalenyl; and, aralkyl groups such as the non-limiting examples benzyl and phenethyl. Some representative examples of "cyclic alkyl" and "cyclic alkenyl" include, but are not limited to, norbornyl, norbornenyl, ethylnorbornyl, ethylnorbornenyl, ethylcyclohexyl, ethylcyclohexenyl, cyclohexylcyclohexyl and cyclododecatrienyl.

In another embodiment herein, the [—Y—(CR$_{3-e}$-Z$_e$)$_b$] moiety of silane (d) of general Formula (1) is selected from the group consisting of —CH=CH—CH$_2$-Z, —C≡CCH$_2$-Z and —ArCH$_2$-Z where Z is a halogen atom and Ar represents an aromatic ring.

In yet another embodiment, each occurrence of X$^1$ is R$^1$O— wherein R$^1$ is independently selected from the group consisting of hydrogen and an alkyl group of specifically from 1 to 6 carbon atoms, more specifically from 1 to 3 carbon atoms and most specifically 2 carbon atoms; each occurrence of X$^2$ and X$^3$ is R$^1$O— or R$^2$— wherein R$^2$ is independently selected from the group consisting of hydrogen and an alkyl group of specifically from 1 to 6 carbon atom, more specifically 1 or 2 carbon atoms and most specifically 1 carbon atom; G is independently a hydrocarbon of specifically from 1 to 10 carbon atoms, more specifically from 1 to 3 carbon atoms and most specifically from 1 carbon atom; each occurrence of R is independently an alkyl group of from 1 to 10 carbons, more specifically from 1 to 3 carbon atoms and most specifically 1 carbon atom; each occurrence of Y is independently an unsaturated groups specifically selected from —CH=CH—, —C≡C— and —C$_6$H$_4$—, more specifically selected from —CH=CH— and —C$_6$H$_4$— and most specifically —C$_6$H$_4$—; each occurrence of Z is specifically Cl— or Br— and more specifically Cl—; and, a, b, c and d are integers in which a is 1, b is 1 or 2, c is 1 or 2, d is 1 or 2 and e is 1 or 2 and more specifically a is 1, b is 1, c is 1, d is 1 and e is 1.

In yet another embodiment herein, silane (d) is at least one silane selected from the group consisting of 3-chloroprop-1-ynyltriethoxysilane, 3-chloroprop-1-enyltriethoxysilane, 3-chloroprop-1-enyltrimethoxysilane, 3-chloroprop-1-enylmethyldiethoxysilane, 3-chloroprop-1-enyldimethylethoxysilane, 3-chloroprop-1-enyltributoxysilane, 3-bromoprop-1-enyltriethoxysilane, 3-bromoprop-1-enyltrimethoxysilane, 3-bromoprop-1-enyltributoxysilane, 3-iodoprop-1-enyltriethoxysilane, 3-iodoprop-1-enyltrimethoxysilane, 3-iodoprop-1-enyltributoxysilane, (p-chloromethylphenylethyl)triethoxysilane, (p-dichloromethylphenylethyl)triethoxysilane, (p-trichloromethylphenylethyl)triethoxysilane, (p-chloromethylphenylethyl)methyldiethoxysilane, (p-chloromethylphenylethyl)dimethylethoxysilane, (p-α-chloroethylphenylethyl)triethoxysilane, (p-α-chloropropylphenylethyl)triethoxysilane, (p-chloromethylphenylethyl)trimethoxysilane, (p-α-chloroethylphenylethyl)trimethoxysilane, (p-α-chloropropylphenylethyl)trimethoxysilane, (p-chloromethylphenylethyl)tributoxysilane, (p-α-chloroethylphenylethyl)tributoxysilane, (p-α-chloropropylphenylethyl)tributoxysilane, (p-bromomethylphenylethyl)triethoxysilane, (p-α-bromoethylphenylethyl)triethoxysilane, (p-α-bromopropylphenylethyl)triethoxysilane, (p-bromomethylphenylethyl)trimethoxysilane, (p-α-bromoethylphenylethyl)trimethoxysilane, (p-α-bromopropylphenylethyl)trimethoxysilane, (p-bromomethylphenylethyl)tributoxysilane, (p-α-bromoethylphenylethyl)tributoxysilane, (p-α-bromopropylphenylethyl)tributoxysilane, (p-iodomethylphenylethyl)triethoxysilane, (p-α-iodoethylphenylethyl)triethoxysilane, (p-α-iodopropylphenylethyl)triethoxysilane, (p-iodomethylphenylethyl)trimethoxysilane, (p-α-iodoethylphenylethyl)trimethoxysilane, (p-α-iodopropylphenylethyl)trimethoxysilane, (p-iodomethylphenylethyl)tributoxysilane, (p-α-iodoethylphenylethyl)tributoxysilane, (p-α-iodopropylphenylethyl)tributoxysilane, (m-chloromethylphenylethyl)triethoxysilane, (m-α-chloroethylphenylethyl)triethoxysilane, (m-α- chloropropylphenylethyl)triethoxysilane, (m-chloromethylphenylethyl)trimethoxysilane, (m-α-chloroethylphenylethyl)trimethoxysilane, (m-α-chloropropylphenylethyl)trimethoxysilane, (m-chloromethylphenylethyl)tributoxysilane, (m-α-chloroethylphenylethyl)tributoxysilane, (m-α-chloropropylphenylethyl)tributoxysilane, (m-bromomethylphenylethyl)triethoxysilane, (m-α-bromoethylphenylethyl)triethoxysilane, (m-α-bromopropylphenylethyl)triethoxysilane, (m-bromomethylphenylethyl)trimethoxysilane, (m-α-bromoethylphenylethyl)trimethoxysilane, (m-α-bromopropylphenylethyl)trimethoxysilane, (m-bromomethylphenylethyl)tributoxysilane, (m-α-bromoethylphenylethyl)tributoxysilane, (m-α-bromopropylphenylethyl)tributoxysilane, (m-iodomethylphenylethyl)triethoxysilane, (m-α-iodoethylphenylethyl)triethoxysilane, (m-α-iodopropylphenylethyl)triethoxysilane, (m-iodomethylphenylethyl)trimethoxysilane, (m-α-iodoethylphenylethyl)trimethoxysilane, (m-α-iodopropylphenylethyl)trimethoxysilane, (m-iodomethylphenylethyl)tributoxysilane, (m-α-iodoethylphenylethyl)tributoxysilane, (m-α-iodopropylphenylethyl)tributoxysilane, 2,2-bis-(triethoxysilyl)-1-(p-chloromethylphenyl)ethane, 2,3-bis-(triethoxysilyl)-1-(p-chloromethylphenyl)propane, $(CH_3CH_2O)_3SiCH_2CH_2CH_2OCH_2CH=CHCH_2Cl$ and mixtures thereof.

In another embodiment, silane (d) is selected from the group consisting of 3-chloroprop-1-enyltriethoxysilane, 3-chloroprop-1-enyltrimethoxysilane, (p-chloromethylphenylethyl)triethoxysilane, (p-α-chloromethylphenylethyl)methyldiethoxysilane, (p-α-chloropropylphenylethyl)dimethylethoxysilane, (p-chloromethylphenylethyl)trimethoxysilane, (p-α-chloropropylphenylethyl)trimethoxysilane, (m-chloromethylphenylethyl)triethoxysilane, (m-α-chloromethylphenylethyl)methyldiethoxysilane, (m-α-chloromethylphenyl)triethoxysilane and mixtures thereof.

In another embodiment, the rubber composition of the present invention can optionally contain one or more other hydrolyzable organosilanes that hydrophobate and aid in the dispersion of silane-reactive filler (b). These hydrolyzable organosilanes contain at least one alkyl group, specifically of from 3 to 18 carbon atoms and more specifically from about 6 to 10 carbon atoms, and at least one $R^3O$— hydrolyzable group wherein $R^3$ is hydrogen or an alkyl, alkenyl, aryl or aralkyl of from 1 to 10 carbon atoms. These hydrolyzable organosilanes can be used, e.g., specifically in amounts of from about 0.5 to about 10 phr and more specifically in amounts of from about 1 to about 5 phr.

In one specific embodiment, the rubber composition herein comprises the mixture and/or reaction product of components (a), (b), optionally (c), and (d).

In a further embodiment herein, in the rubber composition silane (d) bonds to silane-reactive filler (b) through one functionality and to rubber component (a) (e.g., diene polymer) through a different functionality.

In one embodiment, at least one activating agent can be used in the rubber compounding process to facilitate the coupling reactions between rubber component (a) and silane (d). The activating agent can be selected from among the transition metal salts. Transition metal salts are compounds that assist in the removal of the Z group on the silane of general Formula (1) and include metal oxides, metal halides, metal carboxylates, metal hydroxides and other suitable metal complexes. Some representative non-limiting examples of transition metal salts include metal oxides such as zinc oxide, aluminum oxide, and titanium oxide; metal halides, such as zinc chloride, zinc bromide, zinc iodide, aluminum chloride, aluminum bromide, titanium chloride, titanium bromide and stannic chloride; and, metal carboxylates such as zinc stearate, zinc acetate and stannic octanoate.

In one embodiment herein, rubber component (a) can be an organic polymer selected from the group consisting of at least one diene based elastomer and rubber. In one embodiment herein, rubber component (a) can be any of those that are well known in the art many of which are described in "The Vanderbilt Rubber Handbook", R. F. Ohm, ed.; R.T. Vanderbilt Company, Inc., Norwalk, Conn., 1990 and "Manual For The Rubber Industry", T. Kempermann, S. Koch, J. Sumner, eds.; Bayer AG, Leverkusen, Germany, 1993. In yet another further embodiment, some representative non-limiting examples of suitable rubber component (a) (organic polymers) include natural rubber (NR), synthetic polyisoprene (IR), polybutadiene (BR), various copolymers of butadiene, the various copolymers of isoprene and mixtures of these elastomers; solution styrene-butadiene rubber (SSBR), emulsion styrene-butadiene rubber (ESBR), ethylene-propylene terpolymers (EPDM) and acrylonitrile-butadiene rubber (NBR).

In one embodiment herein, rubber component (a) is comprised of at least one diene-based elastomer or rubber. In an even more specific embodiment, suitable monomers for preparing the rubbers are conjugated dienes such as the non-limiting examples of isoprene and 1,3-butadiene, and suitable vinyl aromatic compounds such as the non-limiting examples of styrene and alpha methyl styrene, and combinations thereof. In a particular embodiment, rubber component (a) is a sulfur-curable rubber. In a further embodiment, the diene based elastomer, or rubber, can be selected from the non-limiting examples of at least one of cis-1,4-polyisoprene rubber (natural and/or synthetic), and preferably natural rubber, emulsion polymerization-prepared styrene/butadiene copolymer rubber, organic solution polymerization-prepared styrene/butadiene rubber, 3,4-polyisoprene rubber, isopreneibutadiene rubber, styrene/isoprene/butadiene terpolymer rubber, cis-1,4-polybutadiene, medium vinyl polybutadiene rubber (about 35-50 percent vinyl), high vinyl polybutadiene rubber (about 50-75 percent vinyl), styrene/isoprene copolymers, emulsion polymerization-prepared styrene/butadiene/acrylonitrile terpolymer rubber and butadiene/acrylonitrile copolymer rubber. An emulsion polymerization-derived styrene/butadiene (ESBR) is also contemplated as diene-based rubber for use herein such as one having a relatively low to medium styrene content of from about 20 to about 29 percent bound styrene or, for some applications, an ESBR having a medium to relatively high bound styrene content, in particular, a bound styrene content of from about 30 to about 45 percent. In an even further specific embodiment, emulsion polymerization-prepared styrene/butadiene/acrylonitrile terpolymer rubbers containing from about 2 to about 40 weight percent bound acrylonitrile in the terpolymer are also contemplated as diene-based rubbers for use herein.

In another embodiment herein, the solution polymerization-prepared SBR (SSBR) typically has a bound styrene content in a range of specifically from about 5 to about 50, more specifically from about 9 to about 36 bound styrene and most specifically from about 20 to about 30 weight percent bound styrene. In a more specific embodiment, polybutadiene elastomer can be conveniently characterized, for example, by having at least about 90 weight percent cis-1,4-content.

In still another embodiment herein, rubber component (a) is a diene polymer functionalized or modified by an alkoxysilane derivative. Silane-functionalized organic solution polymerization-prepared styrene-butadiene rubber and silane-functionalized organic solution polymerization-prepared 1,4-polybutadiene rubbers may be used. These rubber compositions are known; see, for example U.S. Pat. No. 5,821,290 the entire contents of which are incorporated by reference herein.

In yet another embodiment herein, rubber component (a) is a diene polymer functionalized or modified by a tin derivative. Tin-coupled copolymers of styrene and butadiene may be prepared, for example, by introducing a tin coupling agent during the styrene and 1,3-butadiene monomer copolymerization reaction in an organic solvent solution, usually at or near the end of the polymerization reaction. Such tin coupled styrene-butadiene rubbers are well known to those skilled in the art; see, for example U.S. Pat. No. 5,268,439, the entire contents of which are incorporated by reference herein. In practice, at least about 50 percent, and more specifically from about 60 to about 85 percent, of the tin is bonded to the butadiene units of the styrene-butadiene rubbers to create a tin-dienyl bond.

In still yet another embodiment, rubber component (a) is selected from the group comprising natural rubber and synthetic polyisoprene.

The expression "silane-reactive filler" shall be understood herein to mean a substance that is capable of reaction with silane (d) to form stable Si—O— filler bonds. The silane-reactive filler includes a substance that is added to rubber component (a) to reinforce the elastomeric network. Reinforcing fillers are materials whose moduli are higher than rubber component (a) of the rubber composition and are capable of absorbing stress from rubber component (a) when this component is strained. In one embodiment, silane-reactive filler (b) includes fibers, particulates and sheet-like structures and can be composed of inorganic minerals, silicates, silica, clays, ceramics, carbon, organic polymers and diatomaceous earth. In one embodiment, silane-reactive filler (b) can be a discrete particle or group of particles in the form of aggregates or agglomerates. Silane-reactive filler (b) can be mixed with other fillers that do not react with silane (d). These fillers are used to either extend rubber component (a) or to reinforce the elastomeric network. Some representative non-limiting examples of suitable silane-reactive filler (b) materials include at least one metal oxide such as silica (pyrogenic and/or precipitated), titanium dioxide, aluminosilicate, alumina and siliceous materials including clays and talc. In a specific embodiment herein, particulate precipitated silica is sometimes used in connection with a silane. In one embodiment, silane-reactive filler (b) is a silica used alone or in combination with one or more other fillers. In another specific embodiment, in one non-limiting embodiment, a combination of silica and carbon black is utilized, such as for reinforcing fillers for various rubber products, including the non-limiting example of treads for tires. In another embodiment, alumina can be used either alone or in combination with silica. The term "alumina" herein refers to aluminum oxide, or $Al_2O_3$. In a further specific embodiment, the fillers can be hydrated or in anhydrous form. Use of alumina in rubber compositions is known; see, for example, U.S. Pat. No. 5,116,886 and EP 631 982, the entire contents of both of which are incorporated by reference herein.

In one embodiment, the term "carrier" as used herein means a porous or high surface area filler or organic polymer that has a high adsorption or absorption capability and is capable of carrying up to about 75 percent liquid silane while maintaining its free-flowing and dry properties. In one embodiment, the carrier filler or carrier polymer herein is essentially inert to the silane and is capable of releasing or deabsorbing the liquid silane when added to the elastomeric composition.

In one embodiment, silane-reactive filler (b) herein can be used as a carrier for liquid silanes and reinforcing fillers for elastomers in which silane (d) herein is capable of reacting or bonding with the surface. In another embodiment, the fillers that are used as carriers are non-reactive with the silanes of this invention. In a particular embodiment, the non-reactive nature of the fillers is demonstrated by the ability of silane (d) to be extracted at greater than about 50 percent of the loaded silane using an organic solvent. In a specific embodiment, the extraction procedure is described in U.S. Pat. No. 6,005,027, the entire contents of which are incorporated herein by reference. In one embodiment, carriers include, but are not limited to, porous organic polymers, carbon black, diatomaceous earth and silicas that are characterized by a relatively low differential of less than 1.3 between the infrared absorbance at 3502 $cm^{-2}$ of the silica when taken at 105° C. and when taken at 500° C. as described in U.S. Pat. No. 6,005,027. In one embodiment, the amount of silane (d) that can be loaded on the carrier is between about 0.1 and about 70 percent. In another embodiment, silane (d) is loaded on the carrier at concentrations between about 10 and about 50 percent.

In one non-limiting embodiment herein, silane-reactive filler (b) includes fillers in which the silane (d) is reactive with the surface of the filler. In a specific embodiment herein, particulate precipitated silica is useful as silane-reactive filler (b), particularly when the silica has reactive surface silanols. In a further embodiment herein, the silane-reactive filler (b) herein may be in the hydrated form.

In one non-limiting embodiment herein, the other fillers that may be mixed with silane-reactive filler (b) can be essentially inert to the silane (d) with which they are admixed as is the case with carbon black or organic polymers, or at least two silane-reactive fillers can be mixed together and can be reactive therewith, e.g., the case with carriers possessing metal hydroxyl surface functionality, e.g., silicas and other siliceous particulates which possess surface silanol functionality, in combination with reinforcing fillers containing metal hydroxyl surface functionality, e.g., alumina, silicas and other siliceous fillers.

In one embodiment herein, precipitated silica is utilized as silane-reactive filler (b). In a more specific embodiment, the silica filler herein can be characterized by having a Brunauer, Emmett and Teller (BET) surface area, as measured using nitrogen gas, specifically in the range of from about 40 to about 600 $m^2/g$, and more specifically in a range of from about 50 to about 300 $m^2/g$ and most specifically in a range of from about 100 to about 150 $m^2/g$. The BET method of measuring surface area described in the Journal of the American Chemical Society, Volume 60, page 304 (1930) and is the method used herein. In yet another specific embodiment, the silica typically can also be characterized by having a dibutylphthalate (DBP) absorption value in a range of specifically from about 100 to about 350, more specifically from about 150 to about 300 and most specifically from about 200 to about 250. In an even further specific embodiment, silane-reactive fillers (b), as well as the aforesaid alumina and aluminosilicate fillers, can be expected to have a CTAB surface area in a range of from about 100 to about 220 $m^2/g$. The CTAB surface area is the external surface area as determined by cetyl trimethylammonium bromide with a pH of 9; the method for its measurement is described in ASTM D 3849.

Mercury porosity surface area is the specific surface area determined by mercury porosimetry. In this technique, mercury is penetrated into the pores of the sample after a thermal treatment to remove volatiles. In a more specific embodiment, set-up conditions use a 100 mg sample, remove volatiles over 2 hours at 105° C. and ambient atmospheric pressure and employ a measuring range of from ambient to 2000 bars pressure. In another embodiment, such evaluation can be performed according to the method described in Winslow, et al. in ASTM bulletin, p. 39 (1959) or according to DIN 66133; for such an evaluation, a CARLO-ERBA Porosimeter 2000 can be used. In one embodiment, the average mercury porosity specific surface area for the selected silane-reactive filler (b) (e.g., silica) should be in a range of, specifically, from about 100 to about 300 $m^2/g$, more specifically from about 150 to about 275 $m^2/g$ and most specifically from about 200 to about 250 $m^2/g$.

In one embodiment, a suitable pore size distribution for the silane-reactive filler (b) (e.g. the non-limiting examples of silica, alumina and aluminosilicate) according to such mercury porosity evaluation is considered herein to be: five percent or less of its pores having a diameter of less than about 10 nm; from about 60 to about 90 percent of its pores have a diameter of from about 10 to about 100 nm; from 10 to about 30 percent of its pores having a diameter of from about 100 to about 1,000 nm; and from about 5 to about 20 percent of its pores have a diameter of greater than about 1,000 nm. In a second embodiment, the silane-reactive filler (b) (e.g., silica) can be expected to have an average ultimate particle size, for example, in the range of from about 0.01 to about 0.05 µm as determined by electron microscopy, although the particles (e.g., silica) can be even smaller, or possibly larger, in size. In one embodiment, various commercially available silicas can be considered for use herein such as those available from PPG Industries under the HI-SIL trademark, in particular, HI-SIL 210, and 243; silicas available from Rhone-Poulenc, e.g., ZEOSIL 1165MP; silicas available from Degussa, e.g., VN2 and VN3, etc. and silicas available from Huber, e.g., HUBER-SIL 8745.

In one embodiment, where it is desired for a rubber composition which contains both a siliceous filler such as silica, alumina and/or aluminosilicates and also carbon black reinforcing pigments, to be primarily reinforced with silica as the reinforcing pigment, it is often more specific that the weight ratio of such siliceous fillers to carbon black is at least about 3/1 and preferably at least about 10/1 and, thus, in a range of from about 3/1 to about 30/1. In a more specific embodiment, silane-reactive filler (b) can comprise from about 15 to about 95 weight percent precipitated silica, alumina and/or aluminosilicate and, correspondingly, from about 5 to about 85 weight percent carbon black having a CTAB value in a range of from about 80 to about 150. In one specific embodiment, alternatively, silane-reactive filler (b) can comprise from about 60 to about 95 weight percent of said silica, alumina and/or aluminosilicate and, correspondingly, from about 40 to about 5 weight percent of carbon black. In another specific embodiment, the siliceous filler and carbon black can be pre-blended or blended together in the manufacture of the vulcanized rubber In one embodiment, there is provided herein a process for preparing a rubber composition comprising mixing components (a), (b), optionally (c), and (d), as defined herein, in effective amounts. In one embodiment herein, an effective amount of silane (d) is specifically from about 0.2 to about 20, more specifically from about 0.5 to about 15 and most specifically from about 2 to about 10 weight percent of silane (d) based on the total weight of rubber composition herein. In another embodiment, an effective amount of silane-reactive filler (b) is specifically from about 2 to about 70, more specifically from about 5 to about 50 and most specifically from about 20 to about 40 weight percent of silane-reactive filler (b) wherein said weight percent is based on the total weight of rubber composition herein. In yet another embodiment herein, an effective amount of rubber component (a) is specifically from about 30 to about 98, more specifically from about 50 to about 95 and most specifically from about 60 to about 80 weight percent of rubber component (a) based on the total weight of the rubber composition-herein. In another embodiment herein, the herein described process for preparing a rubber composition can further comprise curing the rubber composition, before, during and/or after molding the rubber composition. In one embodiment herein, a vulcanized rubber composition should contain a sufficient amount of silane-reactive filler (b) to contribute a reasonably high modulus and high resistance to tear thereto. In a specific embodiment, the combined weight of silane-reactive filler (b) can be as low as about 5 to about 100 parts per hundred of rubber (phr) component (a), but is more specifically from about 25 to about 85 phr, and most specifically from about 50 to about 70 phr.

In one embodiment, silane (d) can be premixed, or pre-reacted, with particles, aggregates and/or agglomerates of silane-reactive filler (b) or added to the rubber mix during the processing or mixing of rubber (a) and silane-reactive filler (b). In another embodiment, if silane (d) and silane-reactive filler (b) are added separately to the process mixture during the rubber component (a) and silane-reactive filler (b), silane (d) can be considered to couple in situ to silane-reactive filler (b).

In one embodiment herein, in practice, sulfur vulcanized rubber products typically are prepared by thermomechanically mixing rubber and various ingredients in a sequentially step-wise manner followed by shaping and curing the compounded rubber to form a vulcanized product. In a more specific embodiment, first, for the aforesaid mixing of the rubber component (a) and various ingredients, typically exclusive of sulfur and sulfur vulcanization accelerators (collectively "curing agents"), the rubber(s) and various rubber compounding ingredients are usually blended in at least one, and optionally two or more, preparatory thermomechanical mixing stage(s) in suitable mixers. Such preparatory mixing is referred to as non-productive mixing or non-productive mixing steps or stages. In a more specific embodiment, such preparatory mixing usually is conducted at temperatures specifically in the range of from about 130° C. to about 180° C. and more specifically in the range of from about 140° C. to about 160° C.

In one embodiment, subsequent to such preparatory mixing stages, in a final mixing stage, sometimes referred to as a productive mixing stage, curing agents, and, optionally, one or more additional ingredients, are mixed with the rubber compound or composition, typically at a temperature in the range of from about 50° C. to about 130° C. which is a lower temperature than those utilized in the preparatory mixing stages, to prevent or retard premature curing of the sulfur-curable rubber, sometimes referred to as scorching of the rubber composition.

In another embodiment, the rubber composition typically is allowed to cool, sometimes after or during a process of intermediate mill mixing, between the aforesaid various mixing steps, for example, to a temperature of about 50° C. or lower.

In another embodiment herein, when it is desired to mold and to cure the rubber composition, the rubber composition is placed in the desired mold and heated to at least about 130° C. and up to about 200° C. causing the vulcanization of the rubber.

By thermomechanical mixing is meant that the rubber compound, or composition of rubber and rubber compounding ingredients, is mixed in a rubber mixer under high shear conditions where it autogenously heats up as a result of the mixing, primarily due to shear and associated friction within the rubber mixture in the rubber mixer. In one embodiment, several chemical reactions can occur at various steps in the mixing and curing processes.

In one embodiment, for example, the independent addition of a sulfur source can be manipulated by the amount of addition thereof and by sequence of addition relative to addition of other ingredients to the rubber mixture.

In another embodiment herein, the rubber composition herein can be prepared by a process comprising the steps of:

a) thermomechanically mixing, in at least one preparatory mixing operation, in a first embodiment to a temperature of from about 140° C. to about 180° C. and in a second embodiment to a temperature of from about 150° to about 170° for a total mixing time in a first embodiment of from about 1 to about 20 minutes and in a second embodiment from about 4 to about 15 minutes, for such mixing operation(s):

i) about 100 parts by weight of at least one sulfur vulcanizable rubber selected from the group consisting of conjugated diene homopolymers and copolymers and copolymers of at least one conjugated diene and aromatic vinyl compound, ii) from about 5 to about 100 parts by weight of silane-reactive filler (b) in a first embodiment and from about 25 to 80 parts by weight of silane-reactive filler (b) in a second embodiment, wherein the silane-reactive filler (b) specifically contains from 0 to about 85 weight percent carbon black, and, iii) from about 0.05 to about 20 parts by weight rubber of at least one silane (d) of general Formula (1) as described above in a first embodiment and from about 2 to 10 parts by weight rubber in a second embodiment;

iv) optionally, from about 0.01 to about 15 parts by weight activator (c) in a first embodiment and from about 1 to about 5 parts by weight activator (c) in a second embodiment;

b) blending the mixture from step (a), in a final thermomechanical mixing step, at a temperature of from about 50° C. to about 130° C. for a time sufficient to blend the rubber component (a), e.g., for from about 1 to about 30 minutes in a first embodiment and for about 1 to about 5 minutes in a second embodiment, and a curing agent at 0 to about 5 parts by weight; and, c) optionally curing said mixture at a temperature in the range of from about 130° C. to about 200° C. for a period of from about 5 to about 60 minutes.

The rubber composition herein can be compounded by methods known in the rubber compounding art such as mixing component (a) (the various sulfur-vulcanizable constituent rubbers) with various commonly used additive materials such as, for example, curing aids such as sulfur, activators, retarders and accelerators, processing additives such as oils, resins, e.g., tackifying resins, silicas, plasticizers, fillers, pigments, fatty acid, zinc oxide, waxes, antioxidants and antiozonants, peptizing agents, and reinforcing materials such as, for example, carbon black, and the like. Depending on the intended use of the rubber composition (sulfur-vulcanizable) and cured rubber composition (sulfur-vulcanized material), the aforementioned additives are selected and commonly used in conventional amounts.

Vulcanization can be conducted in the presence of an additional sulfur vulcanizing agent. In one specific embodiment, some non-limiting examples of suitable sulfur vulcanizing agents include, e.g., elemental sulfur (free sulfur) or sulfur-donating vulcanizing agents such as the non-limiting examples of amino disulfide, polymeric polysulfide or sulfur-olefin adducts, which are conventionally added in the final, i.e., productive, rubber composition mixing step. In another specific embodiment, the sulfur vulcanizing agents (which are common in the art) are used, or added, in the productive mixing stage, in an amount ranging from about 0.4 to about 3 phr, or even in some circumstances, up to about 8 phr, with a range of from about 1.5 to about 2.5 phr, and in some cases from about 2 to about 2.5 phr, being generally suitable.

Vulcanization accelerators, i.e., additional sulfur donors, can also be used if desired. Non-limiting examples of vulcanization accelerators include benzothiazole, alkyl thiuram disulfide, guanidine derivatives and thiocarbamates. Other examples, representative of such accelerators include, but are not limited to, mercapto benzothiazole, tetramethyl thiuram disulfide, benzothiazole disulfide, diphenylguanidine, zinc dithiocarbamate, alkylphenoldisulfide, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N-diphenylthiourea, dithiocarbamylsulfenamide, N,N-diisopropylbenzothiozole-2-sulfenamide, zinc-2-mercaptotoluimidazole, dithiobis(N-methylpiperazine), dithiobis(N-beta-hydroxy ethyl piperazine), dithiobis (dibenzyl amine) and combinations thereof. In another embodiment, other additional sulfur donors, include, e.g., thiuram and morpholine derivatives. In a more specific embodiment, representative of such donors include, e.g., but are not limited to, dimorpholine disulfide, dimorpholine tetrasulfide, tetramethyl thiuram tetrasulfide, benzothiazyl-2,N-dithiomorpholide, thioplasts, dipentamethylenethiuram hexasulfide, disulfidecaprolactam and combinations thereof.

Accelerators are used to control the time and/or temperature required for vulcanization and to improve the properties of the vulcanizate. In one embodiment, a single accelerator system can be used, i.e., a primary accelerator. In another embodiment, conventionally and more specifically, a primary accelerator(s) is used in total amounts ranging from about 0.5 to about 4, preferably from about 0.8 to about 1.5 phr. In a more specific embodiment, combinations of a primary and a secondary accelerator can be used with the secondary accelerator being used in smaller amounts (e.g., from about 0.05 to about 3 phr) in order to activate and to improve the properties of the vulcanizate. In yet a another embodiment, delayed action accelerators can also be used. In yet another embodiment, vulcanization retarders can also be used. In one embodiment, suitable types of accelerators are those such as the non-limiting examples of amines, disulfides, guanidines, thioureas, thiazoles, thiurams, sulfenamides, dithiocarbamates, xanthates and combinations thereof. In a more specific embodiment, the primary accelerator is a sulfenamide. In another specific embodiment, if a second accelerator is used, the secondary accelerator is more specifically a guanidine, dithiocarbamate or thiuram compound.

Optional tackifier resins can be used at levels of from about 0.5 to about 10 phr, and usually from about 1 to about 5 phr. In one specific embodiment, typical amounts of processing aids comprise from about 1 to about 50 phr. Suitable processing aids can include, as non-limiting examples, aromatic, naphthenic and/or paraffinic processing oils and combinations thereof. In yet another specific embodiment, typical amounts of antioxidants are from about 1 to about 5 phr. Representative antioxidants include, as non-limiting examples, diphenyl-p-phenylenediamine and others, e.g., those disclosed in the Vanderbilt Rubber Handbook (1978), pages 344-346. In yet another embodiment, typical amounts of antiozonants are from about 1 to about 5 phr. Typical amounts of optional fatty acids, which can include the non-limiting example of stearic acid, are from about 0.5 to about 3 phr. In one embodiment, typical amounts of zinc oxide are from about 2 to about 5 phr. In yet another specific embodiment, typical amounts of waxes, e.g., microcrystalline wax, are from about 1 to about 5 phr. Typical amounts of peptizers are from about 0.1 to about 1 phr. Suitable peptizers include, as non-limiting examples, pentachlorothiophenol, dibenzamidodiphenyl disulfide and combinations thereof.

The rubber composition herein can be used for various purposes. In one specific embodiment herein, there is provided an article of which at least one component is the herein described cured rubber composition. In another specific embodiment herein, there is provided a tire at least one component of which, e.g., the tread, comprises the herein described cured rubber composition. In yet another specific embodiment, for example, the rubber composition herein can be used for the manufacture of such articles as shoe soles, hoses, seals, cable jackets, gaskets and other industrial goods. Such articles can be built, shaped, molded and cured by various known and conventional methods as is readily apparent to those skilled in the art.

The invention can be better understood by reference to the following examples in which the parts and percentages are by weight unless otherwise indicated.

EXAMPLE 1

Synthesis of the Coupling Agents

Preparation of 3-chloropropenyltriethoxysilane:

A 250 ml 3-neck round-bottom flask was equipped with a reflux condenser, addition funnel and stir bar. Propargyl chloride (50 g, 0.671 mol) and 0.15 g of Platinum (0)-1,3-divinyl-1,1,3,3-tetramethyldisiloxane complex (3% Weight in xylenes) were added to the flask. Triethoxysilane (115.6 g, 0.705 mol) was added dropwise from the addition funnel to the reaction mixture. The flask quickly became warm. After the completion of addition, the flask was kept at 100° C. for one hour. The final product 103 g was purified by distillation (108° C./49 mmHg) as a mixture of isomers. NMR showed a ratio of 1:0.13 of the two isomers.

Preparation of (p-chloromethylphenylethyl)triethoxysilane and (p-methylphenylethyl)triethoxysilane:

A 250 ml 3-neck round-bottom flask was equipped with a reflux condenser, addition funnel and stir bar. Vinylbenzyl chloride (76 g, 0.5 mol) and 0.15 g of Pt-tetravinyl tetramethyl-cyclotetrasiloxane complex (0.104M) were added to the flask. After heating the flask to 95° C., Triethoxysilane (82 g, 0.5 mol) was added dropwise from the addition funnel to the reaction mixture. After the completion of addition, the flask was kept at 100° C. for one hour. After distillation (130° C./0.3 mmHg), pure product 82 g were obtained as a mixture of isomers as characterized by GC/MS and NMR analysis. Following the example procedures as described in U.S. Pat. No. 3,925,435 (Union Carbide Corp.), the contents of which are incorporated by reference herein in their entirety, (p-methylphenylethyl)triethoxysilane (mixture of two isomers) was prepared from transesterification of (p-methylphenylethyl)trichlorosilane (the hydrosilation product between trichlorosilane and p-vinyltoluene).

EXAMPLES 2-5 COMPARATIVE EXAMPLES 1-4

Preparation of the Rubber Compositions

In the following examples, the amounts of reactants are parts per hundred of rubber (phr) unless otherwise indicated. The following rubber compositions were prepared based on natural rubber and reinforced with highly dispersible precipitated silica, the said compositions being intended for tread compounds in truck tires. Formulations for the rubber compositions of these examples are described below in Table 1. The rubber composition of Comp(arative) Ex(ample) 1 contains carbon black as the reinforcing filler. The remaining rubber compositions (Comp. Ex. 2-4 and Ex. 2-5) contain silica as the reinforcing filler. The silane coupling agents tested are used in equal molar amounts of silicon. The rubber compositions of Comp. Ex. 2-4 and Ex. 2-5 have the same formulations except for the silane component.

TABLE 1

Formulations of the Rubber Compositions:

| Components of the Formulations | Comp. Ex. 1 | Comp. Ex. 2 | Comp. Ex. 3 | Comp. Ex. 4 | Ex. 2 | Ex. 3 | Ex. 4 | Ex. 5 |
|---|---|---|---|---|---|---|---|---|
| NR | 100 | 100 | 100 | 100 | 100 | 100 | 100 | 100 |
| Silica |  | 58 | 58 | 58 | 58 | 58 | 58 | 58 |
| CB | 50 | 3 | 3 | 3 | 3 | 3 | 3 | 3 |
| Silane(1)* Comparative |  | 4.4 |  |  |  |  |  |  |
| Silane(2)* Comparative |  |  | 3.8 |  |  |  |  |  |
| Silane(3)* |  |  |  |  |  | 3.8 |  |  |
| Silane(4)* Comparative |  |  |  | 4.5 |  |  |  |  |
| Silane(5)* |  |  |  |  |  |  | 5.0 |  |
| Silane(6)* Comparative |  |  |  |  |  |  |  | 4.3 |
| Silane(7)* |  |  |  |  |  |  |  | 3.9 |
| Process oil | 5.0 | 5.0 | 5.0 | 5.0 | 5.0 | 5.0 | 5.0 | 5.0 |
| ZnO | 4.0 | 4.0 | 4.0 | 4.0 | 4.0 | 4.0 | 4.0 | 4.0 |
| Stearic Acid | 2.0 | 2.0 | 2.0 | 2.0 | 2.0 | 2.0 | 2.0 | 2.0 |
| 6 PPD | 2.5 | 2.5 | 2.5 | 2.5 | 2.5 | 2.5 | 2.5 | 2.5 |
| Naugurd Q | 2.0 | 2.0 | 2.0 | 2.0 | 2.0 | 2.0 | 2.0 | 2.0 |
| Wax | 1.0 | 1.0 | 1.0 | 1.0 | 1.0 | 1.0 | 1.0 | 1.0 |
| Sulfur | 1.4 | 1.4 | 1.4 | 1.4 | 1.4 | 1.4 | 1.4 | 1.4 |
| TBBS | 1.6 | 1.6 | 1.6 | 1.6 | 1.6 | 1.6 | 1.6 | 1.6 |
| DPG |  | 2.0 | 2.0 | 2.0 | 2.0 | 2.0 | 2.0 | 2.0 |

The notation of Table 1 is defined as follows: NR: Natural rubber (SMR-L); silica: Zeosil 1165MP from Rhodia; CB: carbon black (N-220); process oil: Sundex 8125 from Sun Oil; ZnO: Kadox 720C from ZincCorp.; stearic acid: Industrene R from Witco, Crompton; 6 PPD:(Flexzone 7P from Uniroyal); Wax: Sunproof Improved from Uniroyal, Crompton; Naugurd Q: from Uniroyal; Sulfur: Rubbermakers Sulfur 104 from Harwick; TBBS: Delac S from Uniroyal, Crompton; DPG: from Uniroyal, Crompton.

Silanes (1)*Silquest A-1289 and (2)*3-chloropropyltriethoxysilane are available from Momentive Performance Materials; (3)*3-chloropropenyltriethoxysilane, as prepared in Example 1; (4)*((p-methylphenyl)ethyl)triethoxysilane, as prepared in Example 1; (5)*(p-chloromethylphenylethyl)triethoxysilane, as prepared in Example 1; (6)* (p-chloromethylphenylethyl)trimethoxysilane from Gelest; (7)*(p-chloromethylphenyl)triethoxysilane from Gelest.

The mixing of the rubber masterbatch was done in a two-pass procedure as hereinafter described using a Krupp mixer with a 1550 cubic centimenter (cc) chamber volume. In the first pass, the mixer was turned on with the mixer at 30 rpm and the cooling water on full. The rubber polymers were added to the mixer and ram down mixed for 60 seconds. Half of the silica and all of the silane with approximately 35-40 grams of this portion of silica in an ethylvinyl acetate (EVA) bag were added and ran down mixed for 60 seconds. The remaining silica and the processing oil in an EVA bag were next added and ram down mixed for 60 seconds. The mixer throat was dusted down, and the mixer's mixing speed was increased to 90 rpm as required to raise the temperature of the rubber masterbatch to 140° C. The master batch was dumped (removed from the mixer), a sheet was formed on a roll mill set at about 60° to 65° C. and the sheet allowed to cool to ambient temperature.

In the second pass, the sheets from the first pass were added to the mixer and ram down mixed for 60 seconds. The rest of the ingredients except for the curatives were added together and ram down mixed for 60 seconds. The mixer throat was dusted down and the mixer's mixing speed was increased to 90 rpm as required to raise the temperature of the rubber master batch to between 135° C. to 140° C. The rubber master batch was mixed for five minutes and the speed of the Krupp mixer as adjusted to maintain the temperature between 135° C. and 140° C.

The rubber masterbatch and the curatives were mixed on a roll mill heated to between 60° C. and 65° C. The sulfur and accelerators were added to the rubber masterbatch and thoroughly mixed on the roll mill and allowed to form a sheet. The sheet was cooled to ambient before curing.

Measurements and Testing of the Rubber Compositions

The measurement made and the tests used to characterize the rubber compositions are described below. The rubber compositions are characterized before and after curing, as indicated below.

The rheological properties of the compositions were measured on a Monsanto R-100 Oscillating Disk Rheometer and a Monsanto M1400 Mooney Viscometer. The specimens for measuring the mechanical properties were cut from 6 mm plaques cured for (t90+1) minutes at 149° C. Curing and testing of the cured rubber compositions in the form of plaques were carried out according to ASTM standards. In addition, small strain dynamic tests were carried out on a Rheometrics Dynamic Analyzer (ARES-Rheometrics Inc.). Payne effect strain sweeps were carried out from dynamic strain amplitudes of 0.01% to about 25% shear strain amplitude at 10 Hz and 60° C. The dynamic parameters, $G'_{initial}$, $\Delta G'$, $G''_{max}$ and tan $\delta_{max}$, were extracted from the non-linear responses of the rubber compounds at small strains. In some cases, steady state values of tan $\delta$ were measured after 15 minutes of dynamic oscillations at strain amplitudes of 35% (at 60° C.). Temperature dependence of dynamic properties was also measured from about −80° C. to +80° C. at small strain amplitudes (1 or 2%) at a frequency of 10 Hz.

The specific curing procedure and measuring procedures were as follows:

| Curing Procedure/Measurement | Testing Standard |
| --- | --- |
| Mooney viscosity and scorch | ASTM D1646 |
| Oscillating disc rheometry | ASTM D2084 |
| Curing of test plaques | ASTM D3182 |
| Stress-strain properties | ASTM D412 |
| Heat build-up | ASTM D623 |

These experimental tests demonstrate the improved (filler/polymer) coupling performances in the rubber compositions of the present invention compared with known rubber compositions such as those using a carbon black filler (Comp. Ex. 1) or a conventional silane coupling agent such as A-1289 (Comp. Ex. 2).

The data for various properties measured before and after curing of the rubber formulations of Table 1 are presented in Tables 2, 3, and 4 below.

TABLE 2

Rheological Properties of the Rubber Compositions

| Rheological Properties | Comp. Ex. 1 | Comp. Ex. 2 | Comp. Ex. 3 | Comp. Ex. 4 | Ex. 2 | Ex. 3 | Ex. 4 | Ex. 5 |
| --- | --- | --- | --- | --- | --- | --- | --- | --- |
| Mooney Properties | | | | | | | | |
| Viscosity at 100° C. (ML1 + 4) | 48.7 | 37.2 | 31.3 | 33.0 | 34.2 | 38.3 | 41.2 | 43.7 |
| MV at 135° C. (MS1+) | 18.6 | 13.5 | 11.6 | 10.9 | 14.4 | 20.1 | 18.6 | 18.7 |
| Scorch at 135° C. (MS1 + $t_3$) | 12.5 | 6.4 | 11.3 | 11.3 | 13.3 | 17.2 | 16.2 | 16.4 |
| Cure at 135° C. (MS1 + $t_{18}$) (min) | 14.6 | 9.4 | 14.5 | 14.4 | 16.5 | 20.4 | 19.2 | 21.2 |
| Rheometer (ODR) Properties | | | | | | | | |
| $M_H$ (dN-m) (30 min. timer) | 37.7 | 42.1 | 32.1 | 30.3 | 32.7 | 36.1 | 35.8 | 35.0 |
| $M_L$ (dN-m) | 6.9 | 5.1 | 4.5 | 4.4 | 4.6 | 5.4 | 5.2 | 5.1 |
| $M_H - M_L$ | 30.8 | 37.0 | 27.5 | 25.9 | 28.1 | 30.7 | 30.7 | 29.8 |

TABLE 2-continued

Rheological Properties of the Rubber Compositions

| Rheological Properties | Comp. Ex. 1 | Comp. Ex. 2 | Comp. Ex. 3 | Comp. Ex. 4 | Ex. 2 | Ex. 3 | Ex. 4 | Ex. 5 |
|---|---|---|---|---|---|---|---|---|
| t90 (min) (30 min. timer) | 10.5 | 9.7 | 10.1 | 9.8 | 11.0 | 13.4 | 12.7 | 13.8 |
| $t_{s1}$ (min) | 5.9 | 3.3 | 5.5 | 5.5 | 6.3 | 7.7 | 7.2 | 6.7 |

TABLE 3

Physical Properties of the Rubber Compositions

| Physical Properties | Comp. Ex. 1 | Comp. Ex. 2 | Comp. Ex. 3 | Comp. Ex. 4 | Ex. 2 | Ex. 3 | Ex. 4 | Ex. 5 |
|---|---|---|---|---|---|---|---|---|
| Hardness (Shore A) | 63 | 64 | 59 | 60 | 58 | 58 | 57 | 62 |
| Tensile Strength (MPa) | 27.8 | 29.4 | 27.4 | 28.6 | 27.6 | 29.3 | 31.4 | 29.0 |
| Elongation (%) | 588 | 605 | 673 | 646 | 691 | 450 | 486 | 610 |
| 25% Modulus (MPa) | 0.95 | 1.03 | 0.80 | 0.83 | 0.73 | 0.86 | 0.85 | 0.91 |
| 100% Modulus (MPa) | 2.40 | 2.74 | 1.61 | 1.81 | 1.51 | 2.45 | 2.48 | 2.06 |
| 300% Modulus (MPa) | 11.59 | 12.77 | 6.87 | 9.53 | 6.18 | 18.03 | 17.60 | 10.96 |
| RI (300%/25%) | 12.15 | 12.46 | 8.64 | 11.43 | 8.47 | 21.04 | 20.75 | 12.04 |
| RI (300%/100%) | 4.82 | 4.66 | 4.26 | 5.26 | 4.09 | 7.36 | 7.10 | 5.31 |
| Abrasion Loss (DIN) (mm$^3$) | 135 | 155 | 208 | 184 | 192 | 110 | 113 | 169 |

TABLE 4

Dynamic Properties of the Rubber Compositions

| | Comp. Ex. 1 | Comp. Ex. 2 | Comp. Ex. 3 | Comp. Ex. 4 | Ex. 2 | Ex. 3 | Ex. 4 | Ex. 5 |
|---|---|---|---|---|---|---|---|---|
| Dynamic Properties Non-linearity (0-10%) 60° C. | | | | | | | | |
| G'$_{initial}$ (MPa) | 7.37 | 6.9 | 7.22 | 6.39 | 5.37 | 3.28 | 3.01 | 6.69 |
| ΔG' (MPa) | 5.28 | 4.56 | 5.26 | 4.36 | 3.65 | 1.57 | 1.28 | 4.49 |
| G"$_{max}$ (MPa) | 0.917 | 0.72 | 0.829 | 0.681 | 0.58 | 0.261 | 0.208 | 0.703 |
| tanδ$_{max}$ | 0.255 | 0.204 | 0.237 | 0.208 | 0.204 | 0.101 | 0.093 | 0.203 |
| Temperature Dependence | | | | | | | | |
| tanδ 0° C. | 0.199 | 0.183 | 0.211 | 0.204 | 0.201 | 0.172 | 0.162 | 0.197 |
| G' 0° C. (MPa) | 8.05 | 7.29 | 7.54 | 6.7 | 6.19 | 3.26 | 3.22 | 6.99 |
| G' 60° C. (MPa) | 4.37 | 4.4 | 4.3 | 4.1 | 3.31 | 2.34 | 2.27 | 4.27 |
| tanδ 60° C. | 0.196 | 0.154 | 0.182 | 0.162 | 0.164 | 0.092 | 0.078 | 0.157 |

The advantage for reinforcement power obtained with silane (d) in accordance with the invention herein will be readily apparent to those skilled in the art.

Examination of the data presented in Tables 2, 3 and 4 leads to the following observations: the Mooney viscosity values are all low, indicating the good ability of the compositions to be processed in the uncured state and scorching times are long enough to provide a good safety margin.

Compared with the compositions of Comp. Ex. 1 and 2 (the control compositions for carbon black and A-1289, respectively), those of Ex. 3 and 4 have significantly better overall characteristics. In particular, the modulus value under higher deformation (M300) and the (M300/M100) ratio are both appreciably higher for Ex. 3 and 4 than for Comp. Ex. 1 and 2 indicating better reinforcement for the former compared with the latter.

Results for the compositions of Comp. Ex. 3 and Ex. 2 also clearly demonstrate the advantages of the present invention.

In the rubber composition of Comp. Ex. 3 where a less reactive chloropropylsilane was employed, M300 and the (M300/M100) ratio is relatively low whereas in the rubber composition of Ex. 2 where a silane containing a more reactive allylic chloride group in accordance with the invention was utilized, a higher M300 and (M300/M100) ratio are obtained indicating superior reinforcement.

Similar comparisons can be made between rubber compositions of Comp. Ex. 4 where a silane having an unreactive tolyl group was used, and the rubber compositions of Ex. 3 and 4 where a silane containing a benzyl chloride function in accordance with the invention is used. The compositions of Ex. 3 and 4 have significantly better overall properties:

M300 moduli and M300/M100 ratio are appreciably higher indicating better reinforcement between the elastomer and the filler;

Tan delta 60 is appreciably smaller indicating better rolling resistance.

Abrasion Loss (DIN) (mm³) for the compositions of Ex. 3 and 4 are much lower than those of the control compositions (Comp. Ex. 1 for carbon black and Comp. Ex. 2 for silane A-1289) indicating improved abrasion resistance.

The rubber composition of this invention is particularly advantageous for use in the manufacture of tire treads exhibiting low rolling resistance and high wear resistance, especially when the treads are based on natural rubber or synthetic polyisoprene.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A rubber composition comprising:
   (a) at least one rubber component;
   (b) at least one silane-reactive filler;
   (c) optionally, at least one activating agent; and,
   (d) at least one hydrolyzable silane of the general Formula (1):

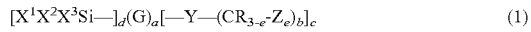

$$[X^1X^2X^3Si-]_d(G)_a[-Y-(CR_{3-e}-Z_e)_b]_c \qquad (1)$$

wherein
   each occurrence of $X^1$ is independently selected from a hydrolyzable group consisting of Cl—, Br—, I—, $R^1O$—, $R^1(=O)O$—, $R^1_2C=NO$—, and $R^1_2NO$—, wherein each $R^1$ is independently selected from the group consisting of hydrogen, straight, cyclic or branched alkyl, alkenyl, aryl and aralkyl groups wherein each $R^1$, other than hydrogen, contains from 1 to 18 carbon atoms and optionally at least one heteroatom selected from the group consisting of oxygen and sulfur;
   each occurrence of $X^2$ and $X^3$ is independently selected from $X^1$ and $R^2$— groups wherein each $R^2$ is independently selected from the group consisting of hydrogen, alkyl, alkenyl, aryl and aralkyl groups wherein each $R^2$, other than hydrogen, contains from 1 to 18 carbon atoms and optionally at least one heteroatom selected from the group consisting of oxygen and sulfur;
   each occurrence of G is independently a divalent or polyvalent hydrocarbon group of from 1 to 18 carbon atoms that can optionally contain at least one heteroatom selected from the group consisting of oxygen, sulfur, phosphorous and silicon;
   each occurrence of Y is independently an unsaturated group;
   each occurrence of Z is independently a halogen atom selected from the groups consisting of F—, Cl—, Br—and I—;
   each occurrence of R is independently selected from the group consisting of hydrogen, alkyl, alkenyl, aryl or aralkyl wherein each R, other than hydrogen, contains from 1 to 30 carbon atoms; and
   each occurrence of subscripts a, b and c are integers independently given by a is 1; b is an integer of from 1 to about 5; c is an integer of from 1 to 3, with the provisos that when a is zero, c is 1, and when a is 1, c is an integer of from 1 to 3; d is an integer of from 1 to 5 and e is an integer of from 1 to 3.

2. The rubber composition of claim 1 wherein rubber component (a) is an organic polymer selected from the group consisting of at least one diene based elastomer or rubber.

3. The rubber composition of claim 1 wherein rubber component (a) is made from monomers selected from the group consisting of conjugated dienes, vinyl aromatic compounds and combinations thereof.

4. The rubber composition of claim 1 wherein rubber component (a) is a sulfur curable rubber.

5. The rubber composition of claim 1 wherein rubber component (a) is at least one selected from the group consisting of natural rubber, synthetic polyisoprene, polybutadiene, copolymers of butadiene, copolymers of isoprene, solution styrene-butadiene rubber, emulsion styrene-butadiene rubber, ethylene-propylene terpolymers, and acrylonitrile-butadiene rubber.

6. The rubber composition of claim 1 wherein the silane-reactive filler (b) is at least one metal oxide.

7. The rubber composition of claim 1 wherein the silane-reactive filler (b) is at least one selected from the group consisting of silica, alumina, titanium dioxide, aluminosilicate materials and alumina siliceous materials.

8. The rubber composition of claim 1 wherein the silane-reactive filler (b) is pyrogenic and/or precipitated silica.

9. The rubber composition of claim 1 wherein the silane-reactive filler (b) is a combination of silica and carbon black.

10. The rubber composition of claim 1 wherein the [Y—$(CR_{3-e}-Z_e)_b$] moiety of the silane (d) of general Formula (1) is selected from the group consisting of –$CH_2$=CH—$CH_2$—Z; —C≡C—$CH_2$—Z; and —Ar—$CH_2$—Z, where Z is a halogen atom and Ar represents an aromatic ring.

11. A rubber composition comprising:
    (a) at least one rubber component;
    (b) at least one silane-reactive filler;
    (c) optionally, at least one activating agent; and,
    (d) at least one hydrolyzable silane;
    wherein the silane (d) is at least one silane selected from the group consisting of 3-chloroprop-1-ynyltriethoxysilane, 3-chloroprop-1-enyltriethoxysilane, 3-chloroprop-1-enyltrimethoxysilane, 3-chloroprop-1-enylmethyldiethoxysilane, 3-chloroprop-1-enyldimethylethoxysilane, 3-chloroprop-1-enyltributoxysilane, 3-bromoprop-1-enyltriethoxysilane, 3-bromoprop-1-enyltrimethoxysilane, 3-bromoprop-1-enyltributoxysilane, 3-iodoprop-1-enyltriethoxysilane, 3-iodoprop-1-enyltrimethoxysilane, 3-iodoprop-1-enyltributoxysilane, (p-chloromethylphenylethyl)triethoxysilane, (p-dichloromethylphenylethyl)triethoxysilane, (p-trichloromethylphenylethyl)triethoxysilane, (p-chloromethylphenylethyl)methyldiethoxysilane, (p-chloromethylphenylethyl)dimethylethoxysilane, (p-α-chloroethylphenylethyl)triethoxysilane, (p-α-chloropropylphenylethyl)triethoxysilane, (p-chloromethylphenylethyl)trimethoxysilane, (p-α-chloroethylphenylethyl)trimethoxysilane, (m-bromomethylphenylethyl)triethoxysilane, (m-α-bromoethylphenylethyl)triethoxysilane, (m-α-bromopropylphenylethyl)triethoxysilane, (m-bromomethylphenylethyl)trimethoxysilane, (m-α-bromoethylphenylethyl)trimethoxysilane, (m-α-bromopropylphenylethyl)trimethoxysilane, (m-bromomethylphenylethyl)tributoxysilane, (m-α-bromoethylphenylethyl)tributoxysilane, (m-α-bromopropylphenylethyl)tributoxysilane, (m-iodomethylphenylethyl)triethoxysilane, (m-α-iodoethylphenylethyl)triethoxysilane, (m-α- iodopropylphenylethyl)triethoxysilane, (m-iodomethylphenylethyl)trimethoxysilane, (m-α-iodoethylphenylethyl)trimethoxysilane, (m-α-iodopropylphenylethyl)trimethoxysilane, (m-iodomethylphenylethyl)tributoxysilane, (m-α-iodoethylphenylethyl)tributoxysilane, (m-αt-iodopropylphenylethyl)tributoxysilane, 2, 2-bis-(triethoxysilyl)-1-(p-chloromethylphenyl)ethane, 2, 3-bis-(triethoxysilyl)-1-(p-chloromethylphenyl)propane, $(CH_3CH_2O)_3SiCH_2CH_2CH_2OCH_2CH\!=\!CHCH_2Cl$, and mixtures thereof.

12. The rubber composition of claim 1 wherein the rubber composition comprises the mixture and/or reaction product of (a), (b), optionally (c) and (d).

13. The rubber composition of claim 1 wherein silane (d) bonds to the silane reactive filler (b) through one functionality and to the rubber component (a) through a different functionality.

14. A process for preparing a rubber composition comprising mixing (a) at least one rubber component; (p-α-chloropropylphenylethyl)trimethoxysilane, (p-chloromethylphenylethyl)tributoxysilane, (p-α-chloroethylphenylethyl)tributoxysilane, (p-α-chloropropylphenylethyl)tributoxysilane, (p-bromomethylphenylethyl)triethoxysilane, (p-α-bromoethylphenylethyl)triethoxysilane, (p-α-bromopropylphenylethyl)triethoxysilane, (p-bromomethylphenylethyl)trimethoxysilane, (p-α-bromoethylphenylethyl)trimethoxysilane, (p-α-bromopropylphenylethyl)trimethoxysilane, (p-bromomethylphenylethyl)tributoxysilane, (p-α-bromoethylphenylethyl)tributoxysilane, (p-α-bromopropylphenylethyl)tributoxysilane, (p-iodomethylphenylethyl)triethoxysilane, (p-α-iodoethylphenylethyl)triethoxysilane, (p-α-iodopropylphenylethyl)triethoxysilane, (p-iodomethylphenylethyl)trimethoxysilane, (p-α-iodoethylphenylethyl)trimethoxysilane, (p-α-iodopropylphenylethyl)trimethoxysilane, (p-iodomethylphenylethyl)tributoxysilane, (p-α-iodoethylphenylethyl)tributoxysilane, (p-α-iodopropylphenylethyl)tributoxysilane. (m-chloromethylphenylethyl)triethoxysilane, (m-α-chloroethylphenylethyl)triethoxysilane, (m-α-chloropropylphenylethyl)triethoxysilane, (m-chloromethylphenylethyl)trimethoxysilane, (m-α-chloroethylphenylethyl)trimethoxysilane, (m-α-chloropropylphenylethyl)trimethoxysilane, (m-chloromethylphenylethyl)tributoxysilane, (m-α-chloroethylphenylethyl)tributoxysilane, (m-α-chloropropylphenylethyl)tributoxysilane, (b) at least one silane-reactive filler;

(c) optionally, at least one activating agent; and, (d) at least one hydrolyzable silane of the general Formula (1):

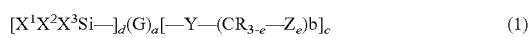

(1)

wherein each occurrence of $X^1$ is independently selected from a hydrolyzable group consisting of Cl—, Br—, I—, $R^1O$—, $R^1(\!=\!O)O$—, $R^1_2C\!=\!NO$—, and $R^1_2NO$—, wherein each $R^1$ is independently selected from the group consisting of hydrogen, straight, cyclic or branched alkyl, alkenyl, aryl and aralkyl groups wherein each $R^1$, other than hydrogen, contains from 1 to 18 carbon atoms and optionally at least one heteroatom selected from the group consisting of oxygen and sulfur;

each occurrence of $X^2$ and $X^3$ is independently selected from $X^1$ and $R^2$— groups wherein each $R^2$ is independently selected from the group consisting of hydrogen, alkyl, alkenyl, aryl and aralkyl groups wherein each $R^2$, other than hydrogen, contains from 1 to 18 carbon atoms and optionally at least one heteroatom selected from the group consisting of oxygen and sulfur;

each occurrence of G is independently a divalent or polyvalent hydrocarbon group of from 1 to 18 carbon atoms that can optionally contain at least one heteroatom selected from the group consisting of oxygen, sulfur, phosphorous and silicon;

each occurrence of Y is independently an unsaturated group;

each occurrence of Z is independently a halogen atom selected from the groups consisting of F—, Cl—, Br— and I—;

each occurrence of R is independently selected from the group consisting of hydrogen, alkyl, alkenyl, aryl or aralkyl wherein each R, other than hydrogen, contains from 1 to 30 carbon atoms; and each occurrence of subscripts a, b and c are integers independently given by a is 1; b is an integer of from 1 to about 5; c is an integer of from 1 to 3, with the provisos that when a is zero, c is 1, and when a is 1, c is an integer of from 1 to 3; d is an integer of from 1 to 5 and e is an integer of from 1 to 3; wherein (a), (b), optionally (c) and (d) are present in an effective amount.

15. The process of claim 14 wherein rubber component (a) is an organic polymer selected from the group consisting of at least one diene based elastomer or rubber.

16. The process of claim 14 wherein rubber component (a) is made from monomers selected from the group consisting of conjugated dienes, vinyl aromatic compounds and combinations thereof.

17. The process of claim 14 wherein rubber component (a) is a sulfur curable rubber.

18. The process of claim 14 wherein rubber component (a) is at least one selected from the group consisting of natural rubber, synthetic polyisoprene, polybutadiene, copolymers of butadiene, copolymers of isoprene, solution styrene-butadiene rubber, emulsion styrene-butadiene rubber, ethylene-propylene terpolymers, and acrylonitrile-butadiene rubber.

19. The process of claim 14 wherein the silane-reactive filler (b) is at least one metal oxide.

20. The process of claim 14 wherein the silane-reactive filler (b) is at least one selected from the group consisting of silica, alumina, titanium dioxide, aluminosilicate materials and alumina siliceous materials.

21. The process of claim 14 wherein the silane-reactive filler (b) is pyrogenic and/or precipitated silica.

22. The process of claim 14 wherein the silane-reactive filler (b) is a combination of silica and carbon black.

23. The process of claim 14 wherein the [—Y—$(CR_{3-e}$—$Z_e)_b$] moiety of the silane (d) of general Formula (1) is selected from the group consisting of —$CH_2$=CH—$CH_2$—Z; —C≡C—$CH_2$—Z; and —Ar—$CH_2$—Z, where Z is a halogen atom and Ar represents an aromatic ring.

24. A process for preparing a rubber composition comprising mixing (a) at least one rubber component;

(b) at least one silane-reactive filler;

(c) optionally, at least one activating agent; and, (d) at least one hydrolyzable silane wherein the silane (c) is at least one silane selected from the group consisting of 3-chloroprop-1-ynyltriethoxysilane, 3-chloroprop-1-enyltriethoxysilane, 3-chloroprop-1-enyltrimethoxysilane, 3-chloroprop-1-enylmethyldiethoxysilane, 3-chloroprop-1-enyldimethylethoxysilane, 3-chloroprop-1-enyltributoxysilane, 3-bromoprop-1-enyltriethoxysilane, 3-bromoprop-1-enyltrimethoxysilane, 3-bromoprop-1-enyltributoxysilane, 3-iodoprop-1-enyltriethoxysilane, 3-iodoprop-1-enyltrimethoxysilane, 3-iodoprop-1-enyltributoxysilane, (p-chloromethylphenylethyl)triethoxysilane, (p-dichloromethylphenylethyl)triethoxysilane, (p-trichloromethylphenylethyl)triethoxysilane, (p-chloromethylphenylethyl)methyldiethoxysilane, (p-chloromethylphenylethyl)dimethylethoxysilane, (p-α-chloroethylphenylethyl)triethoxysilane, (p-α-chloropropylphenylethyl)triethoxysilane, (p-chloromethylphenylethyl)trimethoxysilane, (p-α-chloroethylphenylethyl)trimethoxysilane, (p-α-chloropropylphenylethyl)trimethoxysilane, (p-chloromethylphenylethyl)tributoxysilane, (p-α-chloroethylphenylethyl)tributoxysilane, (p-α-chloropropylphenylethyl)tributoxysilane, (p-bromomethylphenylethyl)triethoxysilane, (p-α-bromoethylphenylethyl)triethoxysilane, (p-α-bromopropylphenylethyl)triethoxysilane, (p-bromomethylphenylethyl)trimethoxysilane, (p-α-bromoethylphenylethyl)trimethoxysilane, (p-α-bromopropylphenylethyl)trimethoxysilane, (p-bromomethylphenylethyl)tributoxysilane, (p-α-bromoethylphenylethyl)tributoxysilane, (p-α-bromopropylphenylethyl)tributoxysilane, (p-iodomethylphenylethyl)triethoxysilane, (p-α-iodoethylphenylethyl)triethoxysilane, (p-α-iodopropylphenylethyl)triethoxysilane, (p-iodomethylphenylethyl)trimethoxysilane, (p-α-iodoethylphenylethyl) trimethoxysilane, (p-α-iodopropylphenylethyl) trimethoxysilane, (p-iodomethylphenylethyl) tributoxysilane, (p-α-iodoethylphenylethyl) tributoxysilane, (p-α-iodopropylphenylethyl) tributoxysilane. (m-chloromethylphenylethyl) triethoxysilane, (m-α-chloroethylphenylethyl) triethoxysilane, (m-α-chloropropylphenylethyl) triethoxysilane, (m-chloromethylphenylethyl) trimethoxysilane, (m-α-chloroethylphenylethyl) trimethoxysilane, (m-α-chloropropylphenylethyl) trimethoxysilane, (m-chloromethylphenylethyl) tributoxysilane, (m-α-chloroethylphenylethyl) tributoxysilane, (m-α-chloropropylphenylethyl) tributoxysilane, (m-bromomethylphenylethyl) triethoxysilane, (m-α-bromoethylphenylethyl) triethoxysilane, (m-α-bromopropylphenylethyl) triethoxysilane, (m-bromomethylphenylethyl) trimethoxysilane, (m-α-bromoethylphenylethyl) trimethoxysilane, (m-α-bromopropylphenylethyl) trimethoxysilane, (m-bromomethylphenylethyl) trimethoxysilane, (m-α-bromoethylphenylethyl) tributoxysilane, (m-α-bromopropylphenylethyl) tributoxysilane, (m-iodomethylphenylethyl) tributoxysilane, (m-α-iodoethylphenylethyl) triethoxysilane, (m-α-iodopropylphenylethyl) triethoxysilane, (m-iodomethylphenylethyl) triethoxysilane, (m-α-iodoethylphenylethyl) trimethoxysilane, (m-α-iodopropylphenylethyl) trimethoxysilane, (m-iodomethylphenylethyl) trimethoxysilane, (m-α-iodoethylphenylethyl) tributoxysilane, (m-α-iodopropylphenylethyl) tributoxysilane, 2,2-bis-(triethoxysilyl)-1-(p-chloromethylphenyl)ethane, 2,3-bis-(triethoxysilyl)-1-(p-chloromethylphenyl)propane, $(CH_3CH_2O)_3SiCH_2CH_2CH_2OCH_2CH=CHCH_2Cl$, and mixtures thereof.

25. The process of claim 14 wherein the rubber composition comprises the mixture and/or reaction product of (a), (b), optionally (c) and (d).

26. The process of claim 14 wherein silane (d) bonds to the silane-reactive filler (b) through one functionality and to the rubber component (a) through a different functionality.

27. The process of claim 14 further comprising curing the rubber composition.

28. An article of which at least one component is the cured rubber composition of claim 1.

29. An article of which at least one component is the cured rubber composition of claim 27.

30. A tire at least one component of which comprises the cured rubber composition of claim 28.

31. A tire at least one component of which comprises the cured rubber composition of claim 29.

32. The rubber composition of claim 1, wherein the silane (d) is pre-mixed or pre-reacted with the silane-reactive filler (b).

33. The rubber composition of claim 32, wherein the silane-reactive filler (b) is at least one selected from the group consisting of silica, alumina, titanium dioxide, aluminosilicate materials and alumina siliceous materials.

34. The rubber composition of claim 33, wherein the silane-reactive filler (b) is pyrogenic and/or precipitated silica.

35. The process of claim 14, wherein the silane-reactive filler (b) and the silane (d) are pre-mixed or pre-reacted prior to mixing with the rubber component (a) and optionally the activating agent (c).

* * * * *